2,867,089
HYDRAULIC FLUID REGULATING VALVE

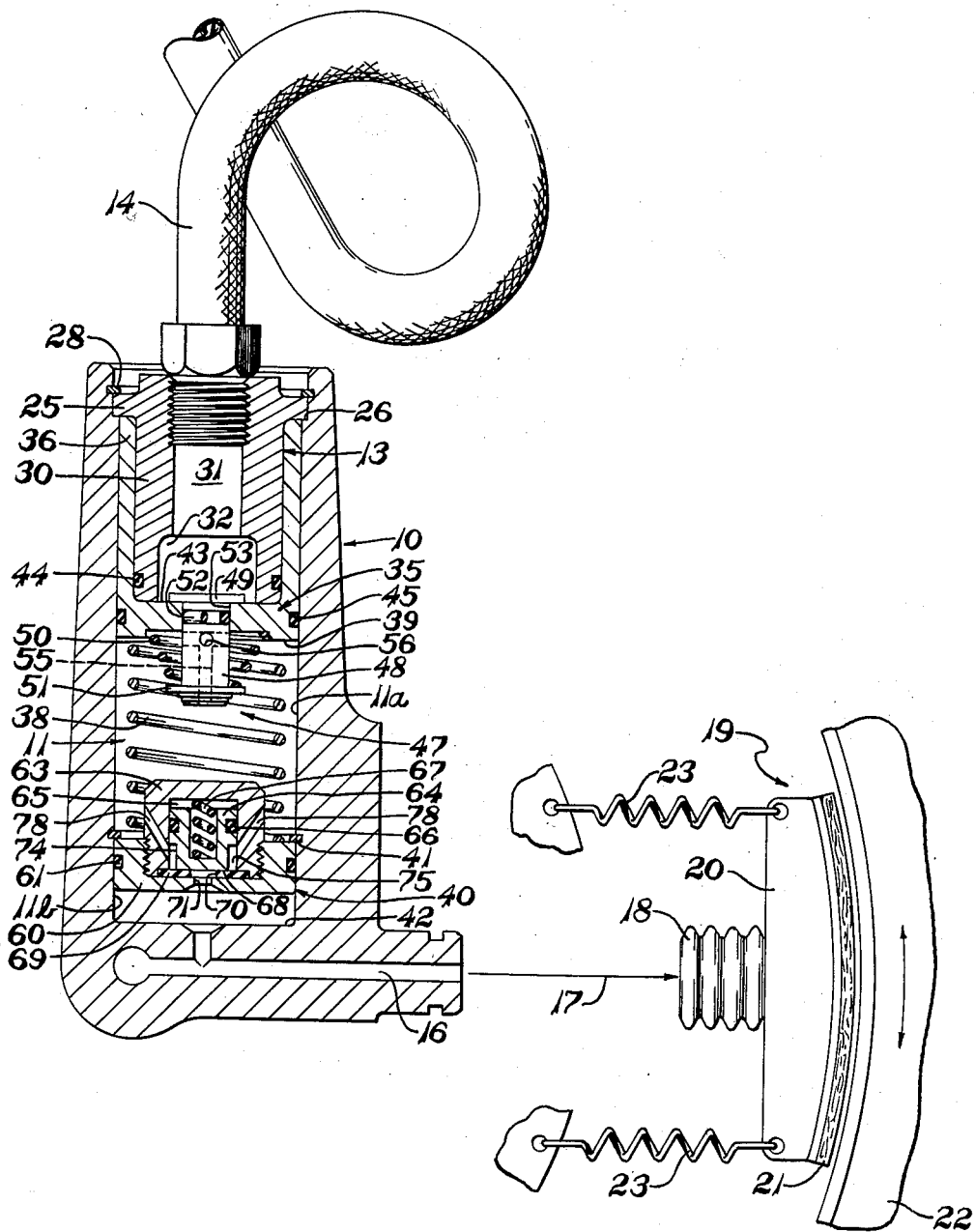
Jan. 6, 1959     J. K. PARMERLEE     2,867,089
HYDRAULIC FLUID REGULATING VALVE
Filed Sept. 19, 1955
INVENTOR.
JAMES K. PARMERLEE
BY
ATTY.

James K. Parmerlee, Troy, Ohio, assignor to The B. F. Goodrich Company, New York, N. Y., a corporation of New York Application September 19, 1955, Serial No. 535,010

5 Claims. (Cl. 60—54.5)

This invention relates to an improved valve mechanism capable of regulating both the quantity and the pressure of hydraulic fluid flowing through the valve in a hydraulic line. It is especially useful in conjunction with hydraulic brakes which require comparatively low fluid pressures and large fluid displacements and the progressive delivery of additional quantites of fluid to the actuating motor of the brake to compensate for attrition of the friction lining faces of the brake shoes.

In its application to a hydraulic brake mechanism, the valve mechanism of this invention is located in a fluid supply line intermediate the fluid motor of the brake and a suitable fluid pressure generator which normally delivers fluid to this mechanism at pressures substantially in excess of that required for operation of the brake. The valve mechanism includes a pair of piston elements housed in a common casing and which mutually cooperate to provide the reduced pressure and the proportionally greater displacement of fluid required for operating the brake motor, and to meter varying quantities of fluid into the brake motor to maintain the brake shoes in a position such that they are moved a uniform distance to engage the brake drum during each successive operation of the brake regardless of the conditio nof wear of the linings of the brake shoes. Fluid may be also metered out of the brake motor by this valve mechanism so that under conditions where the brake shoes may have been over-adjusted relative to the drum, fluid may escape from the brake motor to avoid the hazardous consequences of having the brake shoes become locked against the drum. The valve is particularly light and compact, and offers convenient trouble-free service.

The invention will be further described with reference to the accompanying drawing, in which is shown a longitudinal cross-sectional view of a preferred valve mechanism embodying this invention, together with a schematic illustration of a brake structure with which the mechanism may be associated.

Referring to the drawing, the valve structure includes a body casing 10 having a cylindrical interior opening or bore 11. Secured in the opening 11 at one end of the casing is an end closure plug 13, to which is connected an inlet conduit 14 leading from a suitable fluid pressure generator (not shown). At the opposite end of the casing 10, an outlet passage 16 is provided in communication with the opening 11 and through which passage fluid is delivered into a brake line 17 connected to a fluid motor 18 of a brake mechanism 19. The fluid motor 18, as represented in the diagram, is adapted to expand in response to fluid pressure and urge a brake shoe 20 having friction lining face 21 against a rotating member 22 to dissipate the rotational energy of this member. The actuating motion of the brake shoes is opposed by a pair of retractor springs 23 which are stretched between the brake shoes and with a rigid portion of the frame of the brake and which normally maintain the brake shoes seated against the brake motor and retracted from member 22 when the brake is in de-energized condition.

The closure plug 13 includes a radial flange 25 which is seated in an annular recess 26 formed in the mouth of the opening 11 and is engaged in this recess by an annular snap ring 28. The plug 13 includes a body portion 30 which extends approximately half the length of the opening 11 and which is of smaller diameter than the opening. The closure plug 13 is provided with a central axial opening 31 leading through the body portion 30 from the conduit 14 which is threaded into the mouth of this opening to a chamber 32 at the innermost end of the body 30.

A movable pressure-regulating piston 35 which includes an annular skirt 36 is slidable telescopically on the body portion 30 of the closure plug and is normally maintained seated against the closure plug in the de-energized or non-operating condition of the valve by means of a main spring 38 which acts against the down stream or low pressure side 39 of piston 35. The opposite end of spring 38 is engaged with a flow-regulating piston 40 at the opposite end of the chamber 11 and tends to urge piston 40 away from piston 35. The flow-regulating piston 40 in the de-energized condition is normally maintained seated against a snap ring 41 in the wall of the chamber 11 by the forces exerted by the retractor springs 23 on the column of fluid in the line 17 between the flow-regulator piston 40 and the fluid motor 18. This arrangement of pistons 35 and 40 subdivides the cylindrical opening 11 of the casing 10 into a central chamber 11a between pistons 35 and 40, and into a chamber 11b between piston 40 and the lower end wall 42 of the casing.

When the piston 35 is fully seated about the closure plug 13, the upper surface 43 of the piston abuts the end of the plug and closes the central opening 31. The closure plug is provided with an O-ring seal 44 to prevent leakage of fluid from the opening 31 around the skirt of piston 35. The surface 43 of piston 35, being exposed to full line pressure during operation of the valve and of smaller area than the opposite surface 39 of piston 35, is hereinafter termed the "high pressure" side of piston 35.

The piston 35 further includes an outer peripheral O-ring seal 45 to prevent leakage of fluid around piston 35 from the central chamber 11a which chamber is normally maintained filled with fluid. At the center of piston 35 there is a replenishing valve 47 which provides, when open, for communication between the central opening 31 of the plug 13 and the chamber 11a ahead of the piston. This valve includes a valve stem 48 having a head 49 within chamber 32 of the closure plug which head is urged against surface 43 of the piston in its closed position by a spring 50 acting against the low pressure surface 39 of the piston and an annular flange 51 at the opposite end of stem 48. The stem 48 in its closed position is sealed by an O-ring 52 against the opening 53 in the piston through which the stem extends. The replenishing valve 47, while normally closed, is adapted to be opened against the resistance of the valve spring 50 by engagement of the valve stem with piston 40, as is subsequently explained. The stem 48 has an axial passage 55 intersected by a plurality of transverse passages 56 below the seal 52 to permit flow of fluid through the stem when the stem is axially displaced in the opening 53.

The structural features of the flow-regulating piston 40 include a main piston body 60 having a peripheral O-ring seal 61 bearing against the wall of the opening 11 in which the piston is slidable axially of casing 10. On the side of this piston directed toward chamber 11b there is an annular cap 63 which is threaded into the piston body 60 and which houses a valve body 64. This valve body 64 is seated in a cylindrical passage 65 within the cap and is sealed within the passage by an external O-ring 66.

It is urged forwardly toward the piston body 60 by a spring 67 to maintain the forward face 68 of the valve body seated in pressure engagement with a rubber disc 69 having a central aperture 70 in register with an aperture 71 through the center of the piston body 60. The portion of the valve body 64 between O-ring 66 and its forward face 68 is of smaller diameter than passage 65 and the upper portions of the valve body thereby providing an annular surface 74 on the valve body and an annular chamber 75 surrounding the valve body near the sealing face 68. Through the cap 63 there is a pair of oblique ports 78 leading from the internal chamber 11a into this small annular chamber 75 so that chamber 75 is normally filled with fluid from chamber 11a. It is subsequently explained that the pressure of fluid flowing into the annular chamber 75 through the ports 78 exerts force against the surface 74 of the body 64 to shift this body upwardly against spring 67 to unseat the forward sealing face 68 and permit the flow of fluid from the annular chamber 75 through the central aperture 71 and into the brake line 17. This metering of the fluid occurs automatically when, following wear of the brake shoes, it is necessary to supply an additional volume of fluid to the brake motor 18 to re-establish a particular desired clearance between the shoes 20 and the brake drum 22.

Mode of operation

The drawing shows the relative positions of the several valve parts in the de-energized condition of the brake. Thus the pressure-regulating piston 35 is shown fully seated about the plug 13 and its replenishing valve 47 is held in its closed position by valve spring 50. Also the main spring 38 is under substantial compression between the forward or low pressure side 39 of piston 35 and the flow-regulating piston 40, the latter being urged against the main spring and seated against snap ring 41 by the back pressure of the fluid in the brake line 17 and in the chamber 11b caused by the retractor springs 23 and the resiliency (if any) of the fluid motor 18. The valve body 64 of piston 40 is closed. It will be understood that the motor 18, line 17, and chambers 11a and 11b of this mechanism will be normally full of fluid in the de-energized condition of the brake, although under some circumstances, hereinafter noted, chamber 11a may be only partially full as the valve mechanism is brought into operation.

To energize the brake, an appropriate fluid pressure generator (not shown) is operated to direct high pressure fluid through the line 14 against the high pressure side 43 of the pressure-regulating piston 35 to move piston 35 axially of the casing 10. This results in a corresponding axial movement of the fluid in intermediate chamber 11a and the piston 40, which in turn, displaces the fluid in the chamber 11b into the brake line 17 and into the brake motor.

The pressure of the fluid delivered against piston 35 from line 14 is normally substantially higher than the pressure desired for the fluid to actuate the brake motor. Because of the difference in area between the high pressure side 43 and the low pressure side 39 of piston 35, the line pressure is reduced in proportion to the difference in these areas and the fluid displaced into line 17 is at the pressure desired to operate the brake motor.

When the friction lining of the brake shoe 20 is unworn or in new condition, the volume of fluid displaced from the forward chamber 11b will expand the fluid motor sufficiently to fully engage the brake shoe with the opposite rotating member 22. Accordingly, the shoe (with new lining) will become engaged before the piston 40 reaches the end wall 42 of chamber 11b. As the lining becomes progressively worn it is necessary to displace additional volumes of fluid into the fluid motor to energize the shoe. Hence a condition of operation may eventually occur in which the piston 40 will bottom against the end wall 42 of chamber 11b before the brake shoe is fully engaged. Under these circumstances the incoming high pressure fluid from line 14 will move the piston 35 forwardly toward the now bottomed piston 40, compressing the main spring 38 and causing a rapid increase in pressure in the fluid in intermediate chamber 11a. The increased pressure of this fluid, which is in communication with the annular surface 74 of the valve body 64 through the ports 78, acts against surface 74 to raise valve body 64 against its spring 67 so that an additional volume of fluid may flow into the brake line from the annular chamber 75. This flow will continue until the additional volume required to fully engage the brake shoes is displaced from the chamber 11a by piston 35.

When the brake is thereafter de-energized by relieving the pressure in the fluid of the main supply line 14, the main spring 38 immediately tends to expand against the piston 35 to return this piston to telescopic engagement with the closure plug 13 in the position shown in the drawing. Simultaneously with the release of supply line pressure, the retractor springs 23 acting against the brake shoe and the motor 18 will produce a back flow of fluid from brake line 17 into chamber 11b to displace piston 40 rearwardly against snap ring 41. Valve body 64 snaps fully closed when the back pressure in line 17 becomes less than an amount equal to the load of spring 67 divided by the total area of the face 68 and the annulus 74. The additional volume of fluid previously introduced into the connecting line 17 through adjuster piston 40 will remain trapped in line 17 and this volume will be exactly proportional to the amount of wear which has occurred in the friction lining of the brake shoe. The intermediate chamber 11a will, under these conditions, be emptied by the amount of fluid displaced through piston 40.

The closure action of spring 67 against valve body 64 is aided or supplemented by the small volume of air trapped behind the valve body 64 and its seal 66 within the cap 63. Upon upward displacement of the valve body, this volume of air is compressed and acts like a spring in the same manner in which the spring 67 functions.

After the friction lining is worn an appreciable extent by successive operation of the brake, it will become necessary for the piston 35 to be moved forwardly by the incoming fluid from line 14 to such an extent that the lower tip of the valve stem 48 of piston 35 will eventually engage the cap 63 of piston 40 and thereby open replenishing valve 47. When this condition occurs, the piston 40 will be seated against the end wall 42 and its valve body 64 will be open. Hence fluid may then flow directly from the line 14 through the replenishing valve 47 and through the ports 78 and orifice 70 of the flow-regulating piston 40 into the brake line 17 to supply the additional volume of fluid to effect engagement of the brake shoe with the member 22. As soon as fluid enters the intermediate chamber 11a from line 14, the pressure in chamber 11a tends to rise to a value equal to the line pressure, and since the pressure in the intermediate chamber 11a can act against the greater area of side 39 of piston 35, this pressure tends to force the piston 35 rearwardly toward the closure plug. As soon as the piston 35 is moved to a point where the replenishing valve 47 is clear of the cap 63 and snaps closed, the force of the pressure in the intermediate chamber 11a becomes less than that acting on side 43 of piston 35 and hence the motion of the piston 35 is reversed. In this manner piston 35 tends to oscillate lengthwise of the chamber 11 and thereby maintain the desired pressure reduction differential between the line 14 and the fluid delivered to the brake line substantially constant. There is also some pressure reduction of the fluid as it is throttled through the ports and orifice of the piston 40 so that fluid pressure delivered to the line 17 is substantially uniform even while the replenishing valve 47 is open.

It may be noted in the drawing that in the de-energized condition of the valve mechanism the lower tip of the valve stem 48 of piston 35 is spaced an appreciable distance from cap 63, and upon retraction of the piston 35 following the action described in the preceding paragraph, chamber 11a will be empty of fluid by the amount of this volume. This volume is provided to receive fluid which may leak backwardly through piston 40 into chamber 11a as a result of "over-adjustment" of the brake shoe 20. The so-called "over-adjustment" condition of brake shoes commonly occurs in aircraft brakes because of the thermal expansion or distortion of the rotatable member 22 resulting from heat generated during high energy stops. To prevent brake fade as a brake drum becomes progressively hotter and hence expands to a larger diameter, an additional volume of fluid is supplied to the brake motor to urge the brake shoes into firm engagement with the drum. Upon subsequent cooling of the brake drum the shrinkage of the drum will exert substantial pressure against the brake shoes and materially increase the pressure of the fluid in the brake motor. Unless this pressure is relieved the drum may become locked against the brake shoes and possibly burst the fluid motor or the brake lines. In this valve mechanism, under conditions where the shoes have been overadjusted in this manner, the intermediate chamber 11a will be partially empty and hence there will be no force acting on the valve body 64 of the piston 40 other than the back pressure acting on the small area of the valve stem 64 exposed at the orifice 70. Therefore the increase in pressure of the fluid in the motor 18 resulting from shrinkage of the drum will act against the face of valve body 64 and will be sufficient to unseat this body permitting the fluid to bleed backwardly through the parts 78 into the chamber 11a to relieve this pressure. The valve spring 67 is carefully designed to permit such return flow and a substantial volume of fluid will be returned to the chamber 11a by this means until such time as the brake shoes are just barely touching or are in light pressure contact with the brake drum. On the next succeeding actuation of the brake prior to making a full energy stop (such as when an aircraft is being taxied following a landing), the forward movement of the pressure regulating piston 35 will displace the flow-regulating piston 40 forwardly against the fluid in chamber 11b and since brake shoe 20 will be immediately tightly engaged with the drum, continued forward movement of the piston 35 will urge the piston 40 forwardly so that fluid in chamber 11b will react to open the valve 64 and flow backwardly through the ports 78 until the piston bottoms against the end wall 42 of the cylinder 11. Thereupon on releasing the brake, the desired clearance between the brake shoes and member 22 is re-established and the excess volume of fluid supplied during the over-adjustment condition is returned to the intermediate chamber 11a.

The valve mechanism of this invention is ideally suited for drum-type brakes such as the expander tube brakes and others where overadjustment occurs quite frequently because of high energy braking loads.

Variations in the structure described may be made within the scope of the appended claims.

I claim:

1. A valve mechanism for regulating the quantity and pressure of hydraulic fluid for operating hydraulically actuated equipment, the valve mechanism comprising a casing, a bore therein, a fluid inlet at one end of said bore adapted for communication with a fluid supply source, a fluid outlet at the opposite end of said bore adapted for communication with hydraulically actuated portions of associated equipment, a pressure-regulating piston axially slidable within the portion of said bore adjacent said fluid inlet, a flow-regulating piston axially slidable in the portion of said bore adjacent said fluid outlet, said pistons being axially spaced from each other to define with said bore an intermediate fluid chamber between said pistons, a spring in said chamber for opposing displacement of said pistons relatively toward each other, and means in said chamber to limit the stroke of said flow-regulating piston between two axially-spaced positions thereof, said pressure-regulating piston including a valve and means for urging the valve toward a closed position, the valve being operable to open upon engagement with said flow-regulating piston upon displacement of the pressure-regulating piston toward said flow-regulating piston to provide communication between said inlet and said intermediate chamber, and said flow-regulating piston including an orifice, a housing cap secured to said piston, a valve body slidable in said housing cap having a sealing face directed toward said orifice, a spring within said cap urging said valve body toward said orifice to seat said sealing face against said orifice to close said orifice, and a surface on said valve body in communication with fluid in said intermediate chamber, the valve body being operable when the flow-regulating piston is in either of its two limiting positions to open said orifice in response to a predetermined pressure of fluid in said intermediate chamber against said surface.

2. A valve mechanism for regulating the quantity and pressure of hydraulic fluid for operating hydraulically actuated equipment, the valve mechanism comprising a casing, a bore therein, a fluid inlet at one end of said bore adapted for communication with a fluid supply source, a fluid outlet at the opposite end of said bore adapted for communication with hydraulically actuated portions of associated equipment, a pressure-regulating piston slidable in a portion of said bore adjacent said inlet, a flow-regulating piston slidable in the portion of said bore adjacent said outlet, said pistons being axially spaced to define with said bore an intermediate fluid chamber between said pistons, a spring in said chamber compressed between said pistons, and means for limiting the stroke of said flow-regulating piston between two axially spaced positions in said bore, said flow-regulating piston including an orifice, a valve and means for urging the valve toward a closed position in said orifice, and a surface on said valve in communication with fluid in said intermediate chamber, said valve being operable to open said orifice for flow of fluid through said flow-regulating piston in response to pressure of fluid of said intermediate chamber against said surface when the flow-regulating piston is in either of its two limiting positions, and said pressure-regulating piston including a valve opening, a valve and means for urging the valve toward a closed position in said opening, the latter valve being operable by engagement with means interposed in the path of said pressure-regulating piston at a predetermined axial position of said pressure-regulating piston in said bore to provide communication through said valve opening between said inlet and said intermediate chamber.

3. A valve mechanism for regulating the quantity and pressure of hydraulic fluid for operating hydraulically actuated equipment, the valve mechanism comprising a pressure-regulating piston, a flow-regulating piston, a casing having a bore in which each said piston is slidably positioned, means adapted for communicating fluid from a fluid pressure source with one side of said pressure-regulating piston, means adapted for communicating fluid from one side of said flow-regulating piston with hydraulically actuated equipment, a body of fluid between said pistons communicating with both pistons, spring means for opposing displacement of said pressure-regulating piston in response to fluid pressure from the pressure source and for urging said flow-regulating piston against the fluid communicating with the equipment, and means for limiting the stroke of said flow-regulating piston between two axially spaced positions thereof, said flow-regulating piston including a valve and means for urging said valve toward a closed position, said valve being operable to open when the flow-regulating piston is in either of its two limiting positions in response to a predetermined pressure in said fluid body between said pistons to provide for flow of fluid between said fluid body and said actuated equipment, and said pressure-regulating piston including a valve and means for urging said valve toward a closed position, said valve being operable to open to provide communication between said inlet and said body of fluid between the pistons at a predetermined axial position of said pressure-regulating piston to supply fluid to said body of fluid between said pistons when the volume thereof is depleted by flow through said flow-regulating piston.

4. A valve mechanism for regulating the quantity and pressure of hydraulic fluid, the mechanism comprising a casing, an axial cylindrical opening therein, a cylindrical closure plug extending into one end of the opening and spaced concentrically in said opening from said casing and having a central inlet passage therethrough, a pressure-regulating piston axially slidable within said opening and telescopically engageable with said closure plug, a flow-regulating piston axially slidable within said opening, an outlet through said casing at the end of said opening opposite said closure plug, a spring intermediate said pistons normally urging said pistons apart from each other, said pressure-regulating piston including a valve and means urging said valve toward a closed position, the valve being operable to open upon engagement of said valve with said flow-regulating piston to provide flow of fluid through said pressure-regulating piston from said inlet passage when said pressure-regulating piston is moved to a position adjacent said flow-regulating piston, and said flow-regulating piston including a valve and means urging the latter valve toward a closed position, the latter valve being operable to open in response to fluid pressure directed against the latter said valve in a direction away from said outlet connection.

5. A valve mechanism for regulating the quantity and pressure of hydraulic fluid, the mechanism comprising a casing, an axial cylindrical opening therein, a cylindrical closure plug secured to and extending into one end of the opening and spaced concentrically in said opening from said casing and having a central inlet passage therethrough, a pressure-regulating piston axially slidable within said opening and telescopically engageable with said closure plug, a flow-regulating piston axially slidable within said opening, an outlet passage through said casing at the end of said opening opposite said closure plug, said pistons being axially spaced from each other to define an intermediate fluid chamber between said pistons, a spring in said chamber normally urging said pistons apart from each other, said pressure-regulating piston including a valve and means urging said valve toward a closed position, said valve being operable to open upon engagement of said valve with said flow-regulating piston to provide communication through said pressure-regulating piston between said inlet passage and said chamber, and said flow-regulating piston including a central orifice, a housing cap secured to said piston about said orifice on the side thereof directed toward said chamber, a valve body in said housing cap having a sealing face directed against said orifice, a spring within said cap normally urging said valve body toward said orifice to maintain said sealing face in pressure engagement with the portion of said flow-regulating piston surrounding said orifice, an annular surface on said valve body directed toward said sealing face, and ports through said housing cap for maintaining said annular surface in communication with said intermediate chamber, the valve body being operable in response to a predetermined pressure of fluid in said intermediate chamber against said surface to be displaced away from said orifice.

References Cited in the file of this patent

UNITED STATES PATENTS

| | | |
|---|---|---|
| 2,544,849 | Martin | Mar. 13, 1951 |
| 2,682,149 | Schwenk | June 29, 1954 |